Sept. 7, 1965   R. P. MAY   3,204,805
STERILE DRINKING CONTAINER
Filed April 19, 1963   2 Sheets-Sheet 1
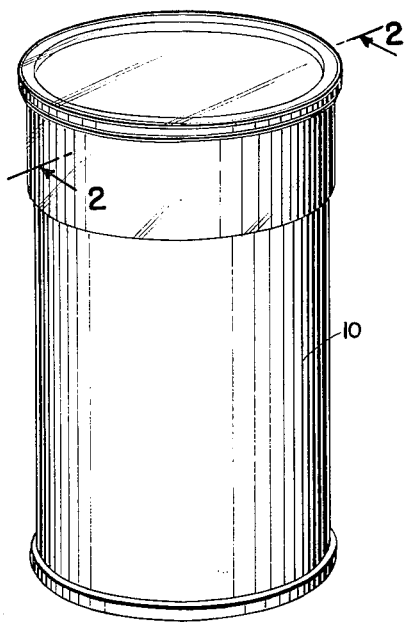
FIG.1.
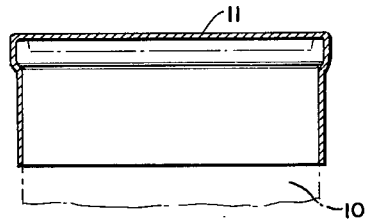
FIG.2.
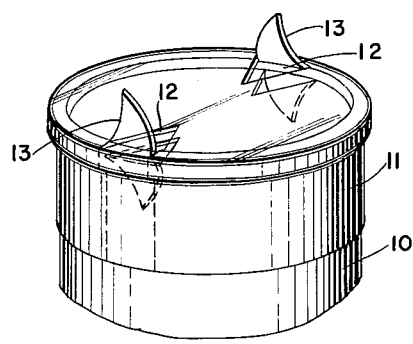
FIG.3.
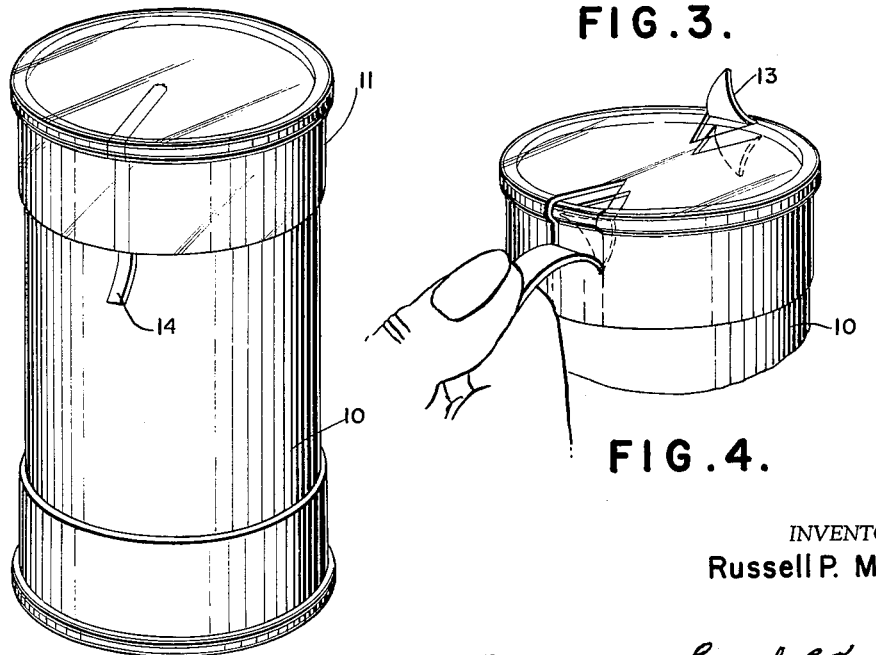
FIG.4.
FIG.5.
INVENTOR
Russell P. May
BY
Frank C Maloy
Agent United States Patent Office 3,204,805
Patented Sept. 7, 1965

3,204,805
STERILE DRINKING CONTAINER
Russell P. May, Washington, D.C., assignor of one-third to William G. H. Finch
Filed Apr. 19, 1963, Ser. No. 274,359
2 Claims. (Cl. 220—24)

The present invention relates to sterile drinking containers and more particularly to sealed receptacles which contain a beverage such as beer, fruit juices or the like.

It is customary to package beer, orange juice and the like in sealed containers such as cans of various sizes whereby the consumer may puncture or otherwise provide one or more openings in one end of the container and then drink the contents directly from the container.

It is one object of the present invention to provide a protected sterile drinking surface in such containers.

A further object of the invention is to provide the container with a strippable coating which protects the sterile surface of the container until such time as the contents are to be consumed.

Referring to the drawing wherein:

FIGURE 1 is a perspective view of a container in sealed condition with the strippable coating applied to the top surface and to a portion of its side surface;

FIGURE 2 is a sectional view taken on lines 2—2 of FIGURE 1;

FIGURE 3 is a perspective view showing the same container with drinking openings provided therein and prior to removal of the protective coating;

FIGURE 4 is a view showing the strippable coating partially removed;

FIGURE 5 is a view showing the same container in which the protective coating is provided on the bottom and side surfaces as well as the top and side surfaces and provided with a tear strip;

Figure 6:
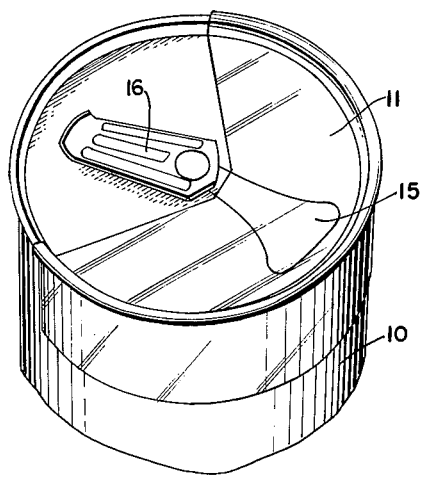
FIGURE 6 is a top perspective view showing the invention applied to a container of the self-opening type.

Referring more particularly to the drawings, 10 indicates a conventional container such as a can made from metal, plastic or any other suitable material. These containers are usually filled under sterile conditions and then sealed for ultimate use by the consumer.

Since the introduction of these containers for beer, soft drinks, fruit juices etc., it has become the common practice for the consumer to open the top of the container by cutting or otherwise providing one or more openings in the container top and drinking the contents directly from the container.

It is found that these filled containers accumulate dirt, dust and other germ carrying matter, which should not come in contact with the consumer's mouth while drinking the contents. These conditions may be due to the storage of the containers in unclean areas or in cooling tanks which are not sterilzed and personal contact with such containers would be conducive to infection of the user and spreading of communicable diseases. The present invention proposes that prior to, or after the container is filled, the entire container, or both ends, or simply a portion of the container, be sterilized and coated with a preferably non-toxic removable sterile plastic cover or coating 11 over all of the areas which would come into contact with the consumer's mouth in the act of drinking the contents.

While any suitable plastic composition may be used, the formulations shown in U.S. Patent No. 2,459,164 to Holst are preferred. Accordingly, in the use of the container shown in FIGS. 1–5, one or more openings are provided in the top of the container (FIG. 3) in the conventional manner while the coating 11 is in place.

As shown in FIG. 2, the plastic coating 11 releases from the top portion of the container because of the flange on the container and is thus slightly spaced from the container top, which assists in permitting the coating to curl back to provide the tabs 13 when severed.

As is well known in the art, plastic coatings may be provided with release agents or other agents tending to apply stresses whereby when the plastic is cut, or severed, it has a tendency to curl backward and this action is utilized in the present invention to form the tabs 13 in the act of forming the openings 12. Thus, when the openings are formed, the metal is forced inwardly of the container, but due to the nature of the coating, the severed portions of the coating are loosened and tend to curl outwardly to provide the tabs 13 for removing the coating. The plastic disclosed in the Holst Patent No. 2,459,164 is believed to contain the desired characteristics, but, of course, any type of plastic may be used.

If a conventional plastic is used, which adheres to both the sides and top of the container, a tear strip or cord 14 (FIGURE 5) may be provided to remove the protective coating.

In FIGURE 5, the coating 11 is shown applied to both ends of the container with an uncoated medial portion. This structure is especially desirable when the container closures are made from an aluminum material which has recently been put on the market. It has been found that these new materials tend to discolor table cloths and like supporting surfaces and by provision of the bottom coating which, of course, is not removed, this objection is overcome.

The application of the coating may be performed in various manners. For instance, the containers may be sterilized before filling and the protective coating applied over the sterilized areas with the other end of the container being open. The container is filled through the open end and then sealed. Or the container may be first filled and sealed and after sterilization the coating may be applied.

In use and when the contents of the container 10 (FIGURES 1–5) are to be used, the container is opened by cutting one or more openings 12 in the protected end and before the contents are consumed, the protective plastic coating 11 is removed. The removal of such coating may be accomplished by the provision of a cutting tab or tear strip 14 (FIG. 5) provided at the time the coating is applied, or may be peeled off by applying the finger nail to some portion of the coating. As above pointed out, the act of forming the openings 12 in the container serves to loosen the plastic coating whereby tabs 13 are formed and these may be utilized to strip the coating from the container.

Figure 7:
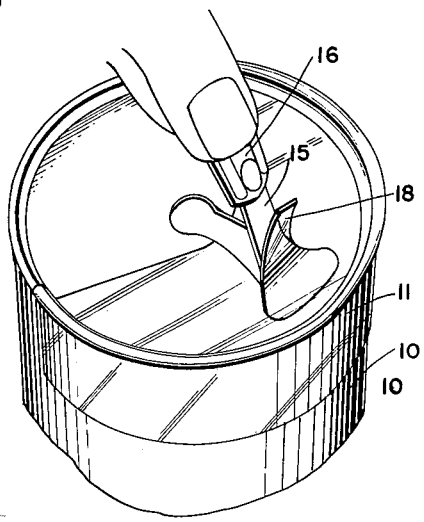
FIGURE 7 is a top perspective view showing this type of container being opened.
Figure 8:
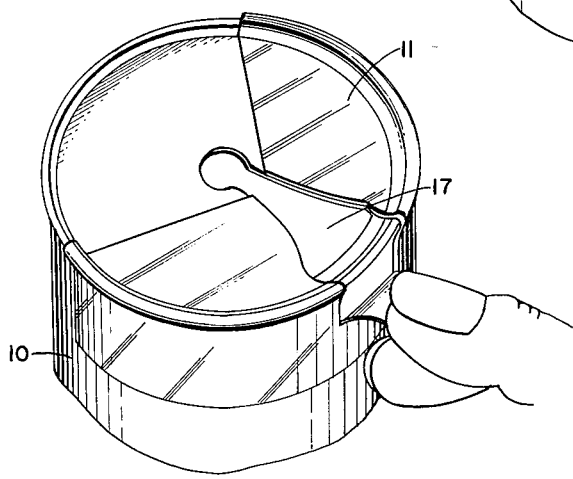
FIGURE 8 is a top perspective view showing the container opened and the coating in the act of being removed.

FIGURES 6, 7 and 8 show the invention applied to the recently introduced "Pop Top" containers which are self opening and do not require the use of opening tools. Accordingly, the coating 11 of the invention is applied as shown in FIGURE 6 over the preformed opening 17 and closure 15. These containers are provided with an opening tab 16 which extends beyond the edge of coating 11. By pulling this tab 16 the closure 15 is removed to provide the drinking opening 17.

In the use of this form of the invention, the act of removing the closure 15 provides a pulling tab 18 to the coating 11 and after removal of the closure 15, the protective coating 11 may be removed by tab 18.

While the foregoing invention has been described in connection with the usual beverage container or can, which is of metal and cylindrical, the principles involved apply equally to other types of containers made from glass, plastic, or other suitable materials, and of whatever shape. The closures for the containers may be of the removable cap or crown type instead of the sealed type described heretofore.

I claim:

1. A sealed container for liquids which container is intended to be utilized by itself as a drinking medium for the liquid contained therein, comprising a body member of metal or similar material and composed of a side wall and opposing sealed ends, one of said ends being substantially flat and constituting the opening and drinking end and having a rim surrounding it, said end having a portion extending radially from a point near its center at least up to the rim and being designed as the opening portion by means of which access can be had to the interior of the container to expose the liquid contents therein and said portion being surrounded at all points including the end, the rim and the side wall by what is designed as a lip-contacting portion to be encompassed by the lips of the mouth, of one drinking the liquid contents from the container, and a strippable, thin, plastic coating, directly connected to and securely and fixedly overlying and completely covering in an adherent fashion said lip-contacting portion, said end being puncturable to form the drinking opening and the plastic covering being so associated with the container that it is strippable from the container by virtue of the formation of the drinking opening whereby the entire mouth portion of the container is protected from contact with the atmosphere until the drinking opening is formed therein and then the plastic coating is removed, leaving a hygienically clean mouth portion.

2. The combination of claim 1, wherein said end is formed with a pre-formed drinking opening therethrough, a tear strip sealing said opening and having an inner end constituting a finger tab, said plastic coating overlying said tear strip with the finger tab extending beyond and being free from said plastic coating to enable the drinking opening to be formed in said end and to facilitate the removal of the plastic coating upon engagement and actuation of the finger tab.

References Cited by the Examiner

UNITED STATES PATENTS

| | | | |
|---|---|---|---|
| D. 195,604 | 7/63 | Fraze | 58—26 |
| 1,664,635 | 4/28 | Magill | 117—6 |
| 2,177,359 | 10/39 | Baker | 220—1 |
| 2,239,691 | 4/41 | Becker | 220—53 X |
| 2,333,887 | 11/43 | Redlinger | 117—6 |
| 2,947,442 | 8/60 | Roeser | 220—64 |
| 2,954,139 | 9/60 | Owens | 215—38 |
| 3,046,711 | 7/62 | Harrison | 215—38 |
| 3,095,103 | 6/63 | Harrison | 215—38 |

THERON E. CONDON, *Primary Examiner.*